(12) United States Patent
Wu et al.

(10) Patent No.: US 8,125,263 B2
(45) Date of Patent: Feb. 28, 2012

(54) CHARGE PUMP

(75) Inventors: Chun-Yi Wu, Hsinchu (TW); Wei-Chih Hsieh, Hsinchu (TW); Ming-Hung Chang, Hsinchu (TW); Wei Hwang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 129 days.

(21) Appl. No.: 12/827,111

(22) Filed: Jun. 30, 2010

(65) Prior Publication Data

US 2011/0221512 A1 Sep. 15, 2011

(30) Foreign Application Priority Data

Mar. 9, 2010 (TW) .............................. 99106829 A

(51) Int. Cl.
*G05F 1/10* (2006.01)
*G05F 3/02* (2006.01)

(52) U.S. Cl. ...................................................... 327/536

(58) Field of Classification Search .................. 327/536; 363/59–60
See application file for complete search history.

(56) References Cited

U.S. PATENT DOCUMENTS

| 6,967,523 | B2* | 11/2005 | DeMone ........................ 327/537 |
| 2005/0146375 | A1* | 7/2005 | Ker et al. ........................ 327/536 |
| 2009/0115498 | A1* | 5/2009 | Al-Shamma et al. ......... 327/536 |

* cited by examiner

*Primary Examiner* — Quan Tra
(74) *Attorney, Agent, or Firm* — Harness, Dickey & Pierce, PLC

(57) ABSTRACT

A charge pump is disclosed for amplifying an input voltage received at an input end and outputting the amplified voltage at an output end as an output voltage. The charge pump includes a plurality of source/drain coupling transistors for serving as charging capacitors, and a plurality of cascode-connected transistors being symmetrically connected to between the input end and the output end. The charge pump further includes a plurality of diode-connected transistors to protect the source/drain coupling transistors against breakdown during the course of charge transfer and to speed up the charge transfer.

10 Claims, 8 Drawing Sheets

CHARGE PUMP

FIELD OF THE INVENTION

The present invention relates to a charge pump, and more particularly to a charge pump having high charge conversion efficiency.

BACKGROUND OF THE INVENTION

Currently, a charge pump is often used as a voltage booster or a voltage multiplier to raise an input voltage supplied from a low voltage source to a working voltage having a relatively higher level, so as to supply the high-level working voltage to various driving circuits that require a higher voltage.

Please refer to FIG. 1 that illustrates a prior art Dickson charge pump. As shown, the Dickson charge pump includes four charging capacitors C1~C4, an output capacitor Cout, and five source/drain coupled n-type metal-oxide-semiconductor field-effect (MOS) transistors T1~T5. The Dickson charge pump has an input end and an output end, the voltage levels thereat are represented by Vin and Vout, respectively. The charging capacitors C1~C4 are separately used to receive clock signals CK and XCK, so as to increase the voltage level Vin at the input end to the voltage level Vout at the output end. The output voltage level Vout can be represented by:

$$Vout = \sum_{i=1}^{5}(Vin - Vt(Mi))$$

Where, Vt(Mi) is a threshold voltage of the source/drain coupled n-type MOS transistors T1~T5. However, when multiple stages of transistors are connected in series in the Dickson charge pump, the threshold voltage would increase to thereby reduce the voltage conversion efficiency as being influenced by the so-called body effect.

FIG. 2 illustrates another prior art charge pump. As shown, this prior art charge pump includes two charge transfer branches, namely, a first branch A and a second branch B. The first charge transfer branch A includes eight (8) transistors MN1~MN4 and MP1~MP4, and four charging capacitors C1-C4. The second charge transfer branch B includes eight (8) transistors MN5~MN8 and MP5~MP8, four charging capacitors C5~C8, and an output capacitor Cout. The charging capacitors C1, C3, C6 and C8 receive clock signals CK and XCK that have a polarity reverse to that of the clock signals CK and XCK received by the charging capacitors C2, C4, C5 and C7. Therefore, the two charge transfer branches A and B can be considered as two independent and reverse-phase charge pump circuits. In the charge pump shown in FIG. 2, the capacitors C1-C8 are off-chip capacitors and therefore the charge pump could not be integrated on a chip. In the case source/drain coupling transistors are used to substitute for the off-chip transistors, the source/drain coupling transistors are subject to breakdown caused by an overly large gate voltage.

SUMMARY OF THE INVENTION

A primary object of the present invention is to provide a charge pump that is able to solve the problem of failing to integrate the charge pump on a chip as found in the prior art.

To achieve the above and other objects, a charge pump capable of amplifying an input voltage received at an input end and outputting the amplified voltage at an output end as an output voltage is provided according to the present invention. The charge pump according to the present invention includes a first clock input, a second clock input, a first cascode section, a second cascode section, a third cascode section, a fourth cascode section, a first source/drain coupling transistor, a second source/drain coupling transistor, a third source/drain coupling transistor, a fourth source/drain coupling transistor, a first diode-connected transistor, a second diode-connected transistor, a first output transistor, and a second output transistor.

The first clock input and the second clock input provide a first clock signal and a second clock signal, respectively. The first cascode section includes a first transistor and a second transistor cascode-connected to between the input end and a first point, and a gate of the first transistor and a gate of the second transistor are connected to each other at a first node. The second cascode section includes a third transistor and a fourth transistor cascode-connected to between the input end and a second point, and a gate of the third transistor and a gate of the fourth transistor are connected to each other at a second node. The third cascode section includes a fifth transistor and a sixth transistor cascode-connected to between the first point and the output end, and a gate of the fifth transistor and a gate of the sixth transistor are connected to each other at a third node. The fourth cascode section includes a seventh transistor and an eighth transistor cascode-connected to between the second point and the output end, and a gate of the seventh transistor and a gate of the eighth transistor are connected to each other at a fourth node. The first source/drain coupling transistor has a source and a drain separately coupled to the first clock input, and a gate coupled to the second node. The second source/drain coupling transistor has a source and a drain separately coupled to the second clock input, and a gate coupled to the first node. The third source/drain coupling transistor has a source and a drain separately coupled to the first node, and a gate coupled to the fourth node. The fourth source/drain coupling transistor has a source and a drain separately coupled to the second node, and a gate coupled to the third node. The first diode-connected transistor is connected to between the second node and the third node. The second diode-connected transistor is connected to between the first node and the fourth node. The first output transistor is connected to between the fourth node and the output end by way of diode; and the second output transistor being connected to between the third node and the output end by way of diode.

The first clock signal has a polarity reverse to that of the second clock signal.

The first node is a connecting point of the cascode-connected first transistor and second transistor; the second node is a connecting point of the cascode-connected third transistor and fourth transistor; the third node is a connecting point of the cascode-connected fifth transistor and sixth transistor; and the fourth node is a connecting point of the cascode-connected seventh transistor and eighth transistor.

With the above arrangements, the charge pump of the present invention has one or more of the following advantages:

(1) The charge pump substitutes the source/drain coupling transistors for the charging capacitors to thereby enable the integration of the charge pump on a chip.

(2) The charge pump is provided with diode-connected transistors to thereby solve the problem of breakdown of transistors.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
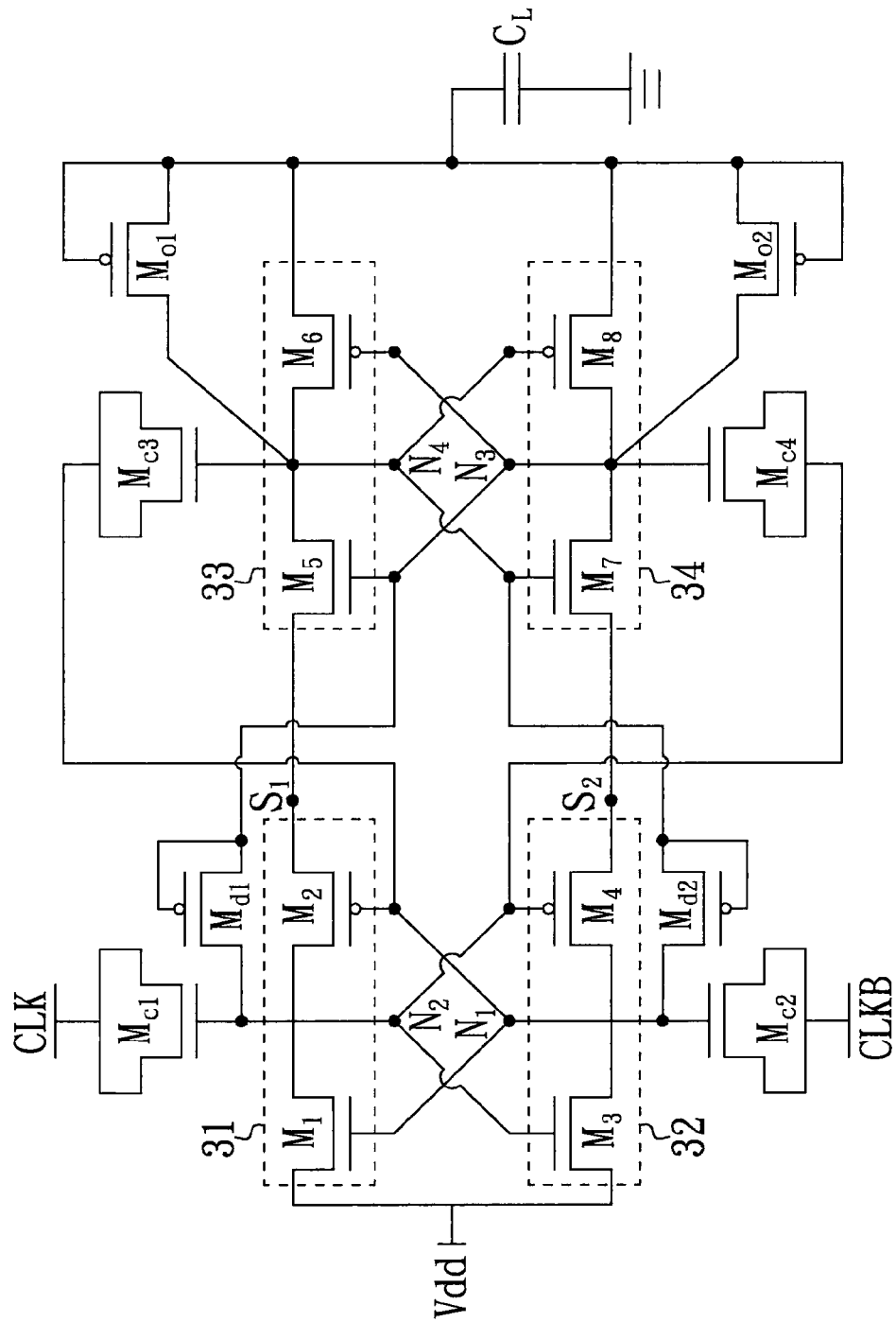
FIG. 3 is a schematic view of a charge pump according to a first embodiment of the present invention.

The present invention will now be described with some preferred embodiments thereof. For the purpose of easy to understand, elements that are the same in the preferred embodiments are denoted by the same reference numerals. Please refer to FIG. 3 that illustrates a charge pump according to a first embodiment of the present invention. As shown, the charge pump includes a first clock output CLK, a second clock output CLKB, a first cascode section 31, a second cascode section 32, a third cascode section 33, a fourth cascode section 34, a first source/drain coupling transistor Mc1, a second source/drain coupling transistor Mc2, a third source/drain coupling transistor Mc3, a fourth source/drain coupling transistor Mc4, a first diode-connected transistor Md1, a second diode-connected transistor Md2, a first output transistor Mo1, a second output transistor Mo2, and a load capacitor CL.

Figure 4:
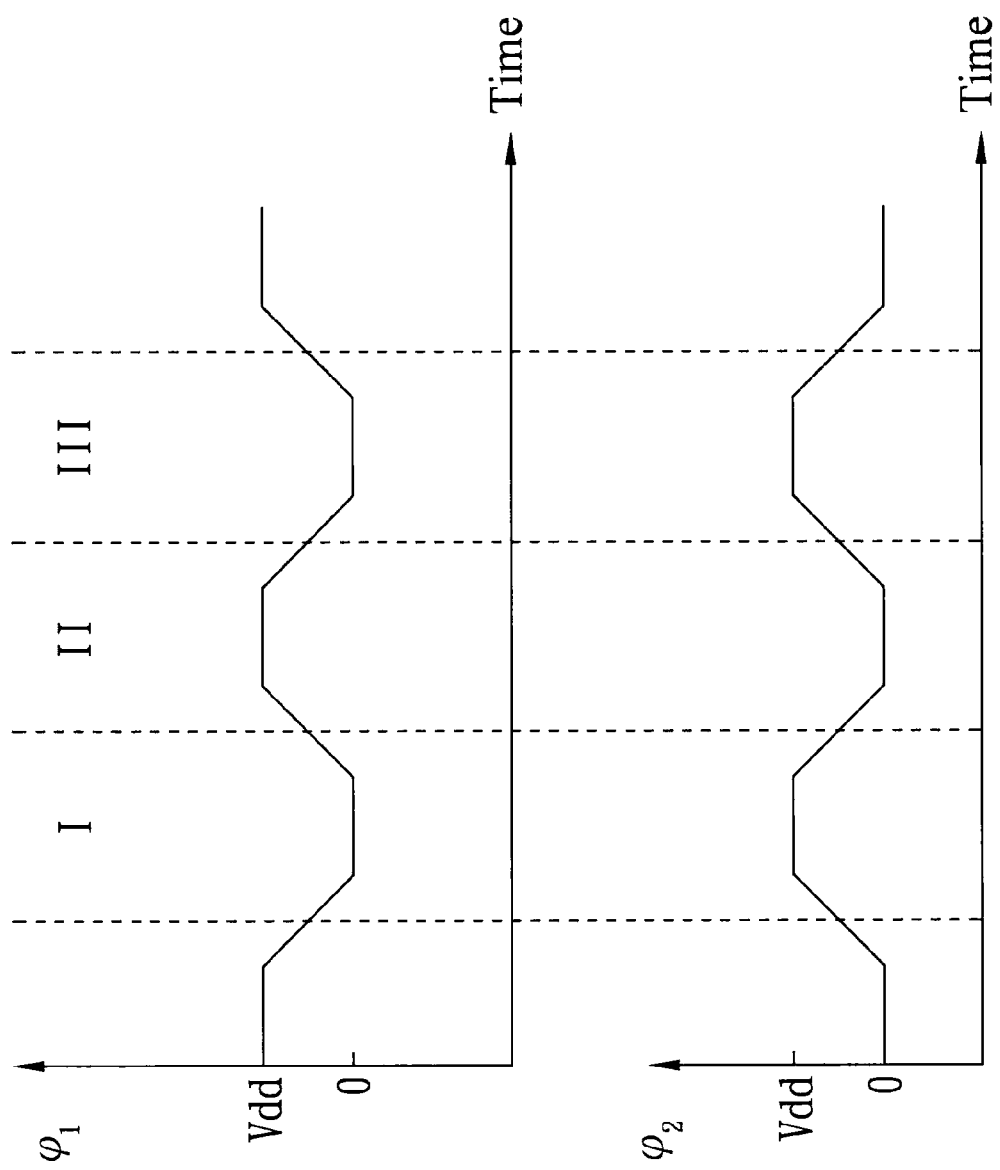
FIG. 4 shows a first clock signal and a second clock signal according to the present invention.

The first clock output CLK provides a first clock signal φ1, and the second clock output CLKB provides a second clock signal φ2. The first clock signal φ1 and the second clock signal φ2 have reversed polarities, as shown in FIG. 4. And, the voltage values of the first clock signal φ1 and the second clock signal φ2 are switched between zero and Vdd.

The first cascode section 31 includes cascode-connected first transistor M1 and second transistor M2, and is connected to between an input end and a first point S1 while the gates of the first and the second transistor M1, M2 are connected to each other at a first node N1. The second cascode section 32 includes cascode-connected third transistor M3 and fourth transistor M4, and is connected to between the input end and a second point S2 while the gates of the third and the fourth transistor M3, M4 are connected to each other at a second node N2. The third cascode section 33 includes cascode-connected fifth transistor M5 and sixth transistor M6, and is connected to between the first point S1 and an output end while the gates of the fifth and the sixth transistor M5, M6 are connected to each other at a third node N3. The fourth cascode section 34 includes cascode-connected seventh transistor M7 and eighth transistor M8, and is connected to between the second point S2 and the output end while the gates of the seventh and the eighth transistor M7, M8 are connected to each other at a fourth node N4. Further, as can be seen from the connection shown in FIG. 3, the first node N1 is the connecting point of the cascode-connected first transistor M1 and second transistor M2, the second node N2 is the connecting point of the cascode-connected third transistor M3 and fourth transistor M4, the third node N3 is the connecting point of the cascode-connected fifth transistor M5 and sixth transistor M6, and the fourth node N4 is the connecting point of the seventh transistor M7 and eighth transistor M8.

Preferably, the first transistor M1, the third transistor M3, the fifth transistor M5 and the seventh transistor M7 are n-type Metal-oxide-semiconductor field-effect (MOS) transistors, while the second transistor M2, the fourth transistor M4, the sixth transistor M6 and the eighth transistor M8 are p-type MOS transistors.

Figure 1:
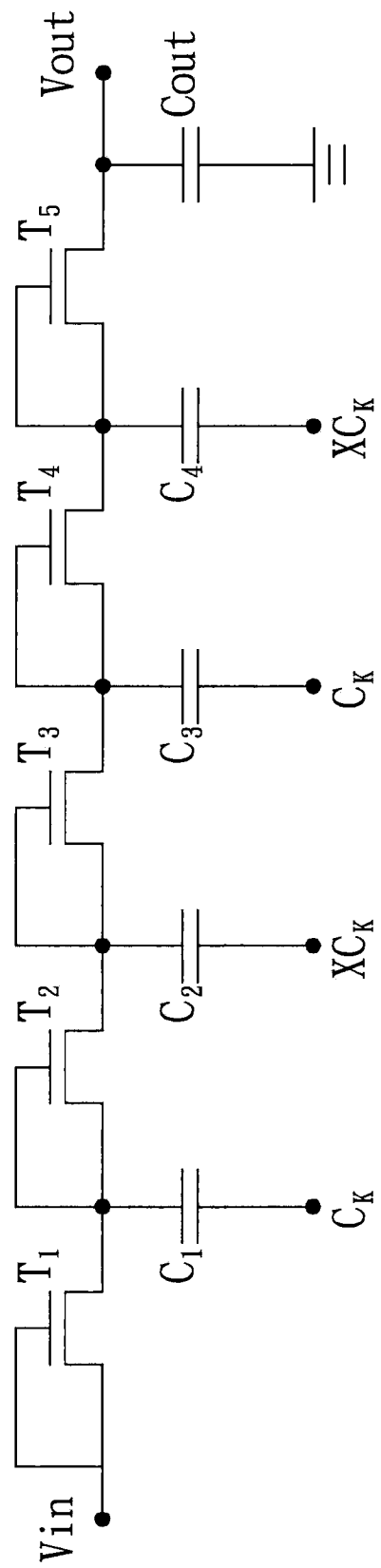
FIG. 1 illustrates a prior art Dickson charge pump.
Figure 2:
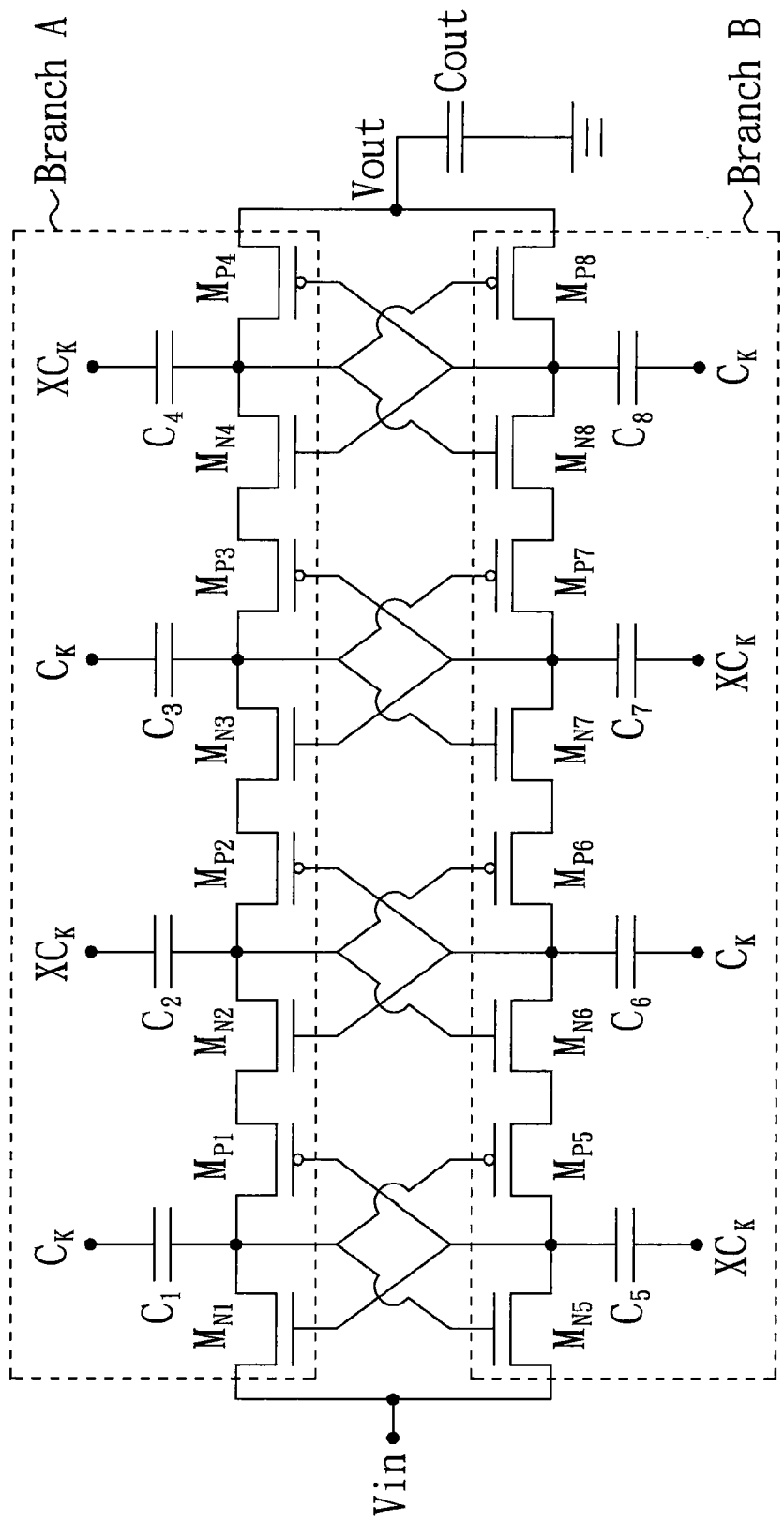
FIG. 2 illustrates another prior art charge pump.

The first source/drain coupling transistor Mc1, the second source/drain coupling transistor Mc2, the third source/drain coupling transistor Mc3, and the fourth source/drain coupling transistor Mc4 respectively utilize the parasitic capacitance between source/drain and gate to replace the charging capacitors shown in FIG. 2 to thereby enable the integration of the charge pump of the present invention on a chip via a standard MOS process. The connection of the source/drain coupling transistors Mc1~Mc4 to one another has been shown in FIG. 3 and is therefore not further described.

In FIG. 4, there are defined three phases I, II and III. In the first phase I and the third phase III, the first clock signal φ1 and the second clock signal φ2 provide a voltage value of zero and Vdd, respectively. Therefore, the first transistor M1, the fourth transistor M4, the sixth transistor M6 and the seventh transistor M7 are ON while the second transistor M2, the third transistor M3, the fifth transistor M5 and the eighth transistor M8 are OFF. In the second phase II, the transistors M1~M8 respectively have an ON/OFF state reverse to that in the first phase I or the third phase III.

In the first phase I or the third phase III, in which first clock signal φ1 is low (0V), the voltage values of the first node N1 and the second node N2 are increased to 2Vdd and Vdd, respectively; and the voltage values of the third node N3 and the fourth node N4 are increased to 3Vdd and 2Vdd, respectively. In the second phase II, in which the first clock signal φ1 is high (Vdd), the voltage values of the first node N1 and the second node N2 are Vdd and 2Vdd, respectively; and the voltage values of the third node N3 and the fourth node N4 are 2Vdd and 3Vdd, respectively. Thus, the third source/drain coupling transistor Mc3 and the fourth source/drain coupling transistor Mc4 would break down because a voltage difference between the gate and the source/drain exceeds 2Vdd.

For the purpose of integrating the charge pump of the present invention on a chip without causing breakdown of the source/drain coupling transistors, the first diode-connected transistor Md1 is additionally provided between the second node N2 and the third node N3, the second diode-connected transistor Md2 is additionally provided between the first node N1 and the fourth node N4, the first output transistor Mo1 is provided between the fourth node N4 and the output end by way of diode, and the second output transistor Mo2 is provided between the third node N3 and the output end by way of diode.

After the above-mentioned transistors are provided, in the phases with the first clock signal φ1 being low (0V), the charge transfer operation is executed along a path from the first transistor M1 via the first diode-connected transistor Md1 and the first output transistor Mo1 to the load capacitor CL at the output end; and in the phase with the first clock signal φ1 being high (Vdd), the charge transfer path is from the fourth transistor M4 via the seventh transistor M7 and the sixth transistor M6 to the load capacitor CL at the output end. During the course of charge transfer by controlling the charge pump via the clock signals φ1 and φ2, it is able to avoid the source/drain coupling transistors from breakdown due to an exceeded voltage difference of 2Vdd between the gate and the source/drain of the coupling transistors. In addition, it is also able to speed up the charge transfer process to obtain upgraded transfer efficiency.

Figure 5:
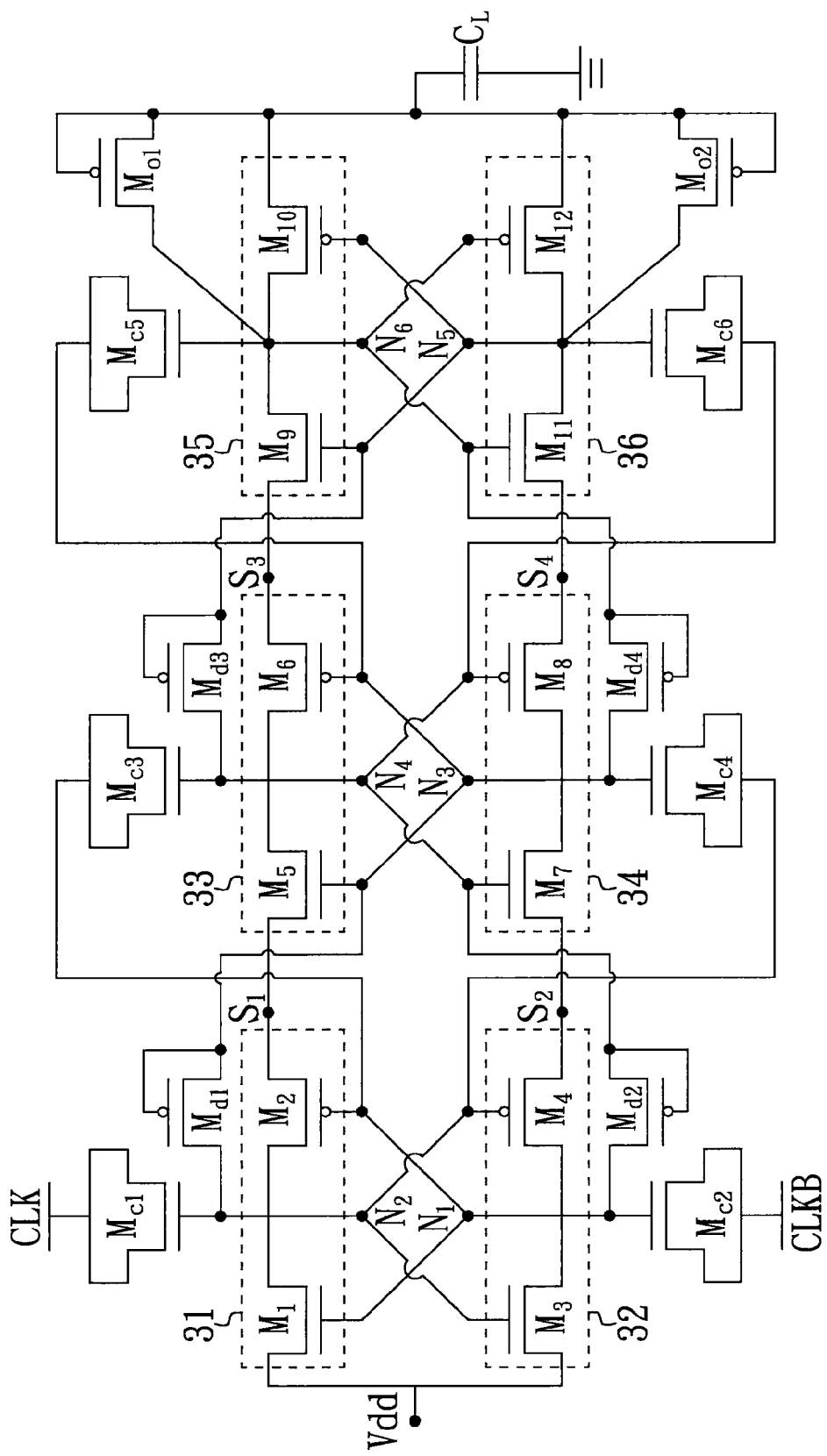
FIG. 5 is a schematic view of a charge pump according to a second embodiment of the present invention.
Figure 6:
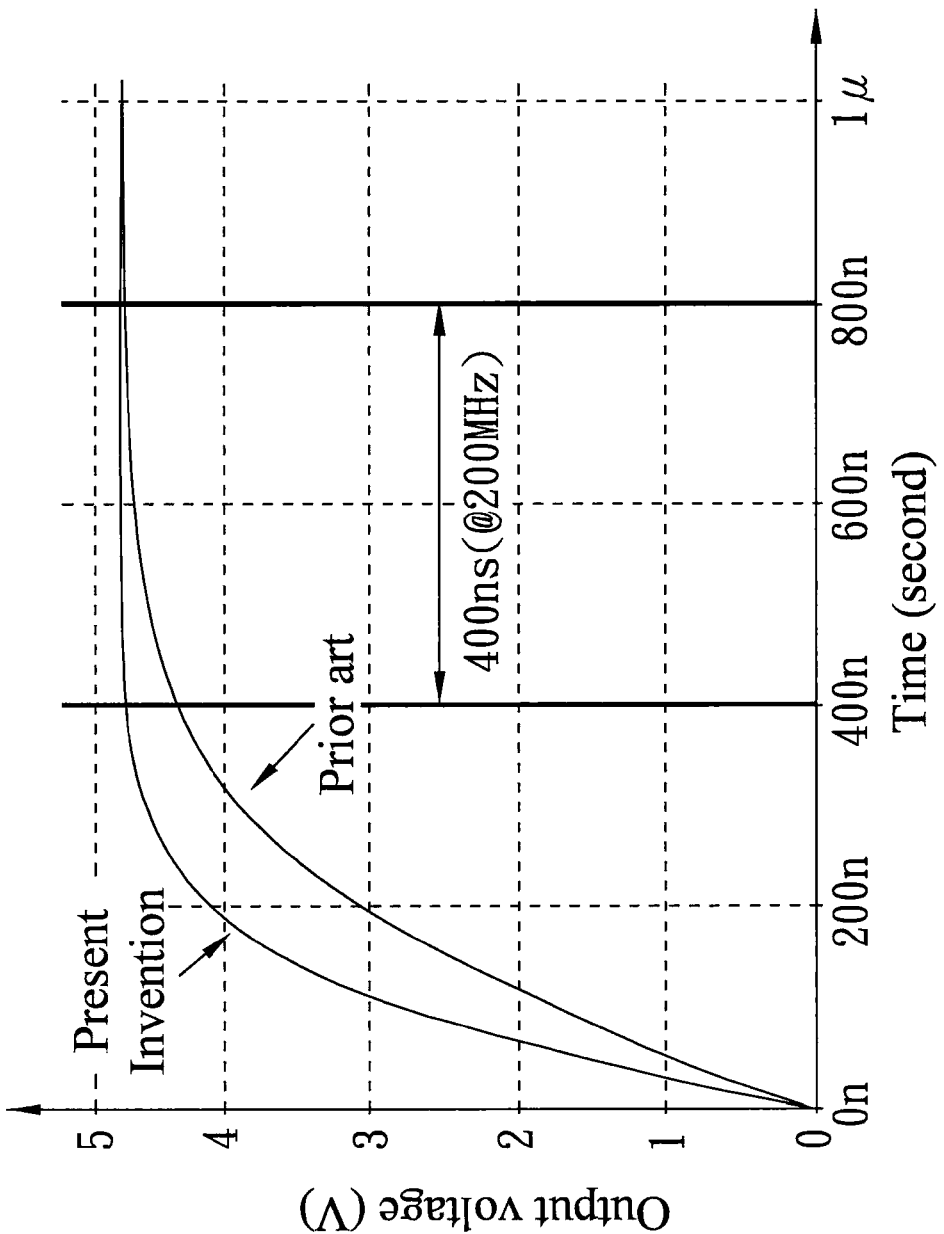
FIG. 6 shows the output voltage transient responses of the charge pump according to the second embodiment of the present invention and a prior art charge pump.

Please refer to FIG. 5 that is a schematic view of a charge pump according to a second embodiment of the present invention. The second embodiment is different from the first embodiment in that a fifth cascode section 35, a sixth cascode section 36, a fifth source/drain coupling transistor Mc5, a sixth source/drain coupling transistor Mc6, a third diode-connected transistor Md3, and a fourth diode-connected transistor Md4 are further provided in the charge pump. Since all other electronic elements in the second embodiment are connected in manners similar to those in the first embodiment and are illustrated in FIG. 5, they are not further described herein. After the above-mentioned additional transistors are added, it is able to generate at the output end an output voltage having a voltage value of 5Vdd. Please refer to FIG. 6, which shows the output voltage transient responses of the charge pump according to the second embodiment of the present invention and a prior art charge pump. As shown, after the above-mentioned additional transistors are added, the charge pump of the present invention has a response time from 0V to 5V faster than that of the prior art charge pump.

Figure 7A:
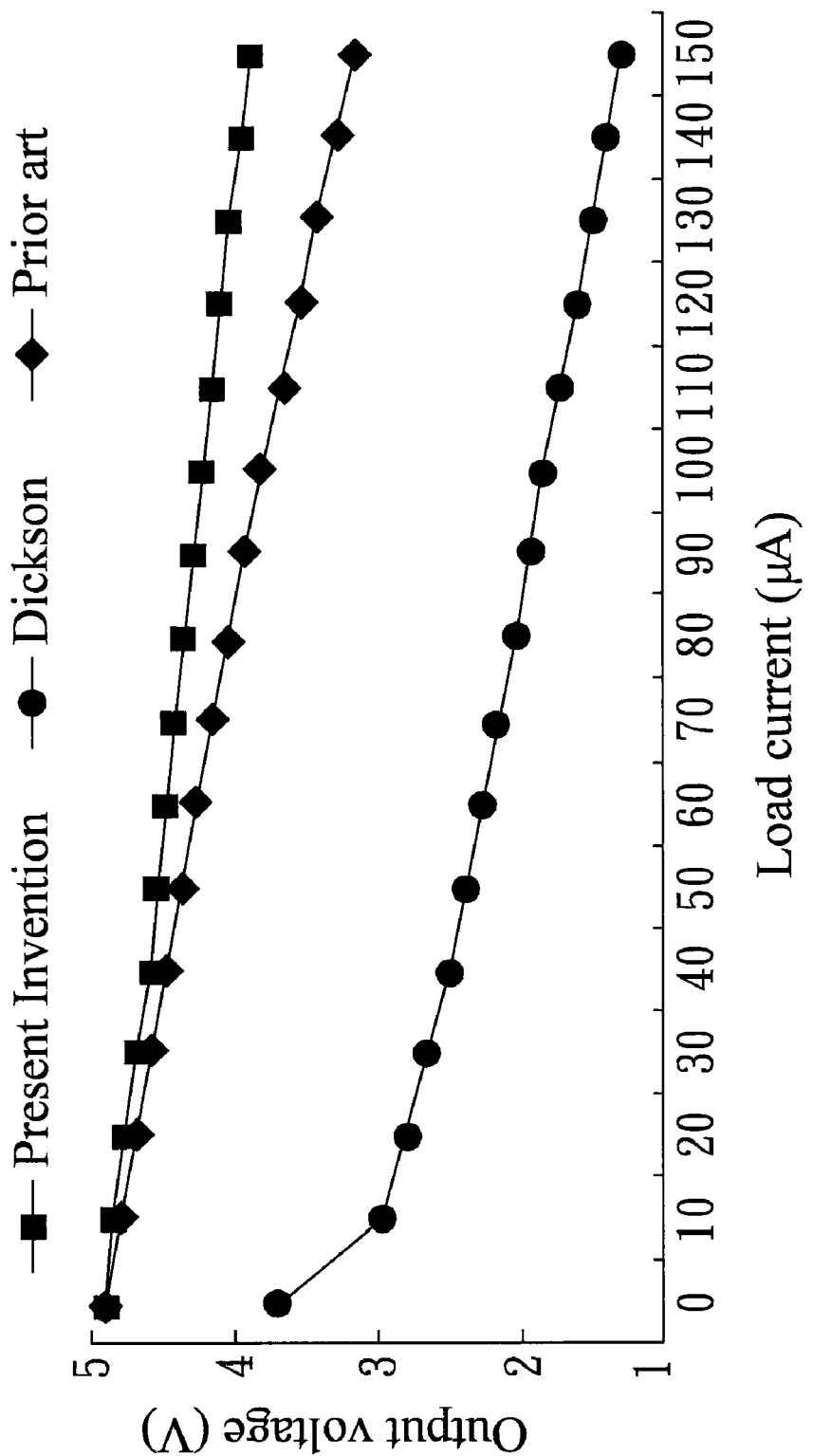
FIG. 7A is a graph illustrating the output voltage-output current relationship of the charge pump according to the second embodiment of the present invention and of different prior art charge pumps.
Figure 7B:
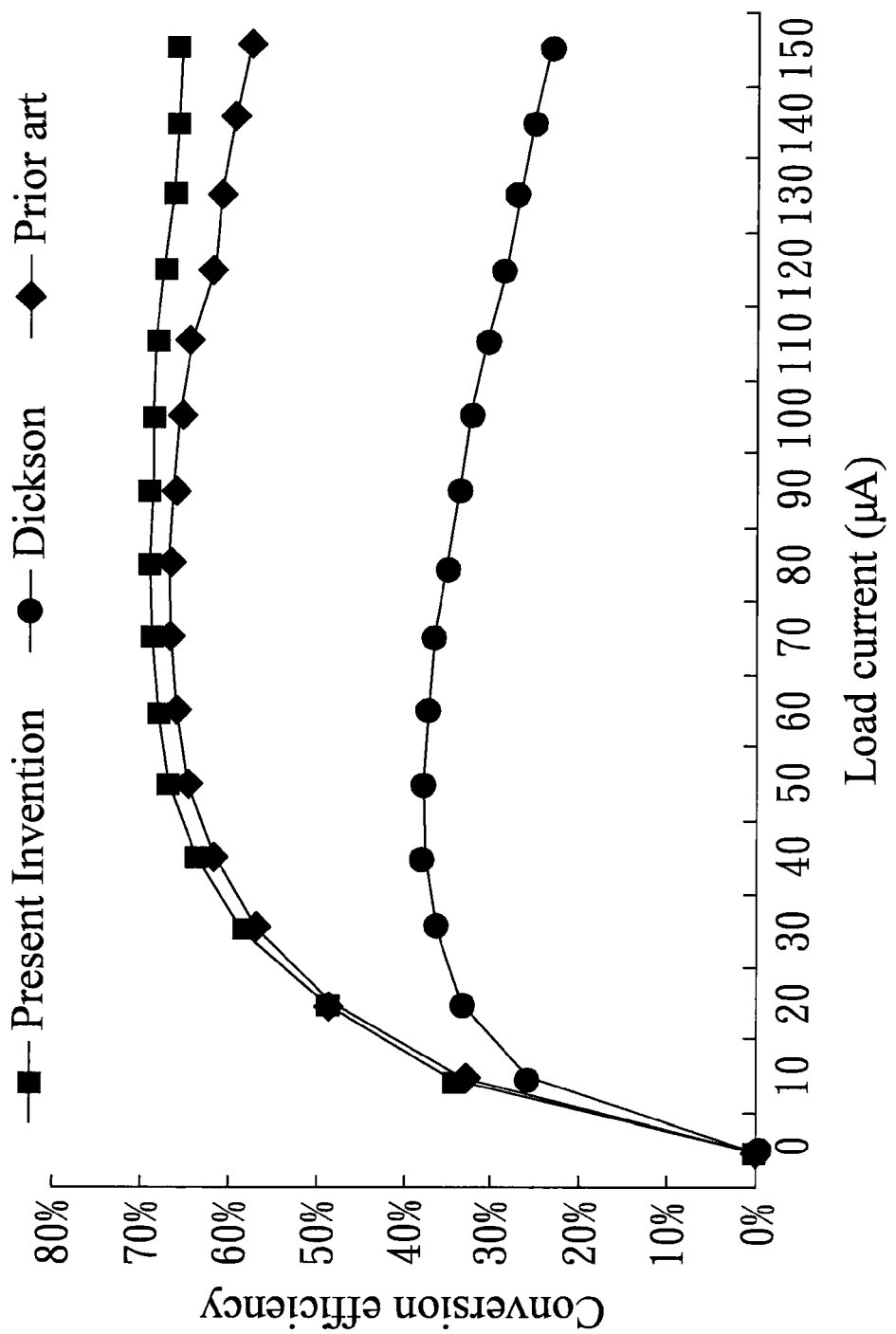
FIG. 7B is a graph illustrating the conversion efficiency of the charge pump according to the second embodiment of the present invention and of different prior art charge pumps.

FIG. 7A illustrates the output voltage-output current relationship of the charge pump according to the second embodiment of the present invention and of different prior art charge pumps, and 7B illustrates the conversion efficiency of the charge pump according to the second embodiment of the present invention and of different prior art charge pumps. Please refer to FIGS. 7A and 7B the same time. As shown, under the same operating conditions, the charge pump of the present invention can generate an output voltage at the output end and provide conversion efficiency higher than those of the prior art charge pumps.

In the following Table 1, a comparison of the charge pump of the present invention with other prior art charge pumps is shown. As can be seen from Table 1, under the same operating conditions, the charge pump of the present invention provides higher output voltage and conversion efficiency than the prior art charge pumps.

TABLE 1

|  | Dickson Charge Pump | Prior Art Charge Pump | Present Invention |
|---|---|---|---|
| Process technology | 90 nanometer | 90 nanometer | 90 nanometer |
| Input voltage | 1 V | 1 V | 1 V |
| Clock rate | 200 MHz | 200 MHz | 200 MHz |
| Off-chip capacitor | 2 pF | 1 pF | None |
| MOS capacitor | none | none | 1 pF |
| Output voltage (load 150 μA) | 1.26 V | 3.14 V | 3.88 V |
| Conversion efficiency (load 150 μA) | 23.9% | 57.56% | 65.46% |

The present invention has been described with some preferred embodiments thereof and it is understood that many changes and modifications in the described embodiments can be carried out without departing from the scope and the spirit of the invention that is intended to be limited only by the appended claims.

What is claimed is:

1. A charge pump for amplifying an input voltage received at an input end and outputting the amplified voltage from an output end as an output voltage, comprising:
   a first clock input for providing a first clock signal;
   a second clock input for providing a second clock signal;
   a first cascode section including a first transistor and a second transistor cascode-connected to between the input end and a first point, and a gate of the first transistor and a gate of the second transistor being connected to each other at a first node;
   a second cascode section including a third transistor and a fourth transistor cascode-connected to between the input end and a second point, and a gate of the third transistor and a gate of the fourth transistor being connected to each other at a second node;
   a third cascode section including a fifth transistor and a sixth transistor cascode-connected to between the first point and the output end, and a gate of the fifth transistor and a gate of the sixth transistor being connected to each other at a third node;
   a fourth cascode section including a seventh transistor and an eighth transistor cascode-connected to between the second point and the output end, and a gate of the seventh transistor and a gate of the eighth transistor being connected to each other at a fourth node;
   a first source/drain coupling transistor having a source and a drain separately coupled to the first clock input, and a gate coupled to the second node;
   a second source/drain coupling transistor having a source and a drain separately coupled to the second clock input, and a gate coupled to the first node;
   a third source/drain coupling transistor having a source and a drain separately coupled to the first node, and a gate coupled to the fourth node;
   a fourth source/drain coupling transistor having a source and a drain separately coupled to the second node, and a gate coupled to the third node;
   a first diode-connected transistor being connected to between the second node and the third node;
   a second diode-connected transistor being connected to between the first node and the fourth node;
   a first output transistor being connected to between the fourth node and the output end by way of diode; and
   a second output transistor being connected to between the third node and the output end by way of diode;
   wherein the first clock signal has a polarity reverse to that of the second clock signal; and
   wherein the first node is a connecting point of the cascode-connected third transistor and fourth transistor; the second node is a connecting point of the cascode-connected first transistor and second transistor; the third node is a connecting point of the cascode-connected fifth transistor and sixth transistor; and the fourth node is a connecting point of the cascode-connected seventh transistor and eighth transistor.

2. The charge pump as claimed in claim 1, wherein the first source/drain coupling transistor, the second source/drain coupling transistor, the first output transistor and the second output transistor are n-type MOS transistors.

3. The charge pump as claimed in claim 1, wherein the first diode-connected transistor, the second diode-connected transistor, the third diode-connected transistor, and the fourth diode-connected transistor are p-type MOS transistors.

4. The charge pump as claimed in claim 1, wherein the first transistor, the third transistor, the fifth transistor and the seventh transistor are n-type MOS transistors.

5. The charge pump as claimed in claim 1, wherein the second transistor, the fourth transistor, the sixth transistor, and the eighth transistor are p-type MOS transistors.

6. The charge pump as claimed in claim 1, further comprising:
- a fifth cascode section including a ninth transistor and a tenth transistor cascode-connected to between the third cascode section and the output end, and a gate of the ninth transistor and a gate of the tenth transistor being connected to each other at a fifth node;
- a sixth cascode section including an eleventh transistor and a twelfth transistor cascode-connected to between the fourth cascode section and the output end, and a gate of the eleventh transistor and a gate of the twelfth transistor being connected to each other at a sixth node;
- a fifth source/drain coupling transistor having a source and a drain separately coupled to the third node, and a gate coupled to the sixth node;
- a sixth source/drain coupling transistor having a source and a drain separately coupled to the fourth node, and a gate coupled to the fifth node;
- a third diode-connected transistor being connected to between the fourth node and the fifth node; and
- a fourth diode-connected transistor being connected to between the third node and the sixth node.

7. The charge pump as claimed in claim 6, wherein the ninth transistor and the tenth transistor are n-type MOS transistors, and the eleventh transistor and the twelfth transistor are p-type MOS transistors.

8. The charge pump as claimed in claim 6, wherein the fifth source/drain coupling transistor and the sixth source/drain coupling transistor are n-type MOS transistors.

9. The charge pump as claimed in claim 6, wherein the third diode-connected transistor and the fourth diode-connected transistor are p-type MOS transistors.

10. The charge pump as claimed in claim 1, further comprising a load capacitor connected to between the output end and a ground.

* * * * *